June 18, 1968  I. R. BRENHOLDT ET AL  3,388,629
DETECTION MEANS FOR STAR TRACKER
Filed Nov. 7, 1963  7 Sheets-Sheet 1
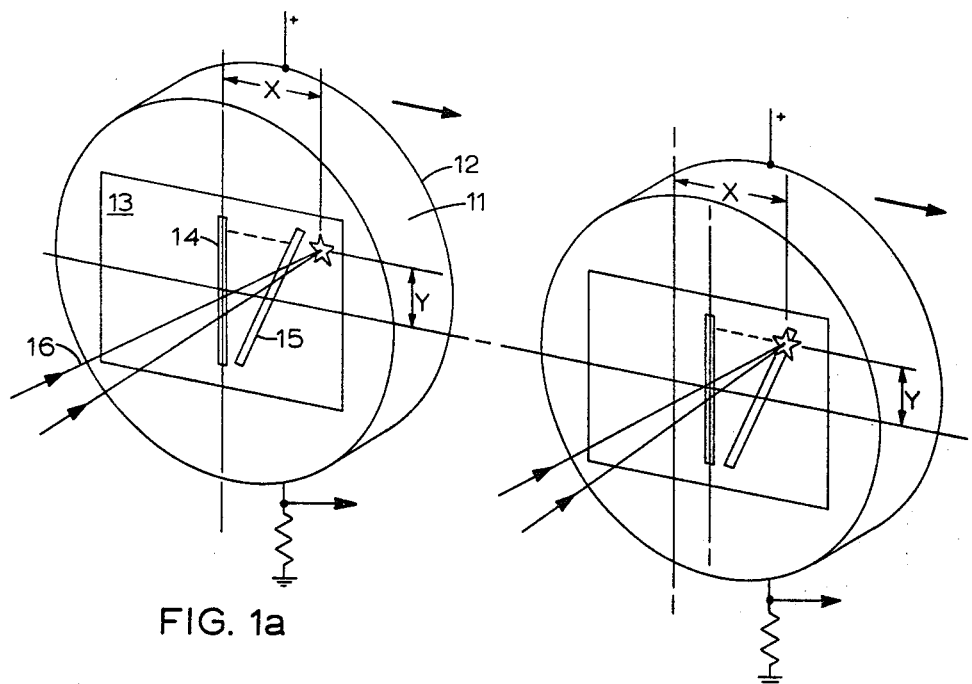
FIG. 1a
FIG. 1b
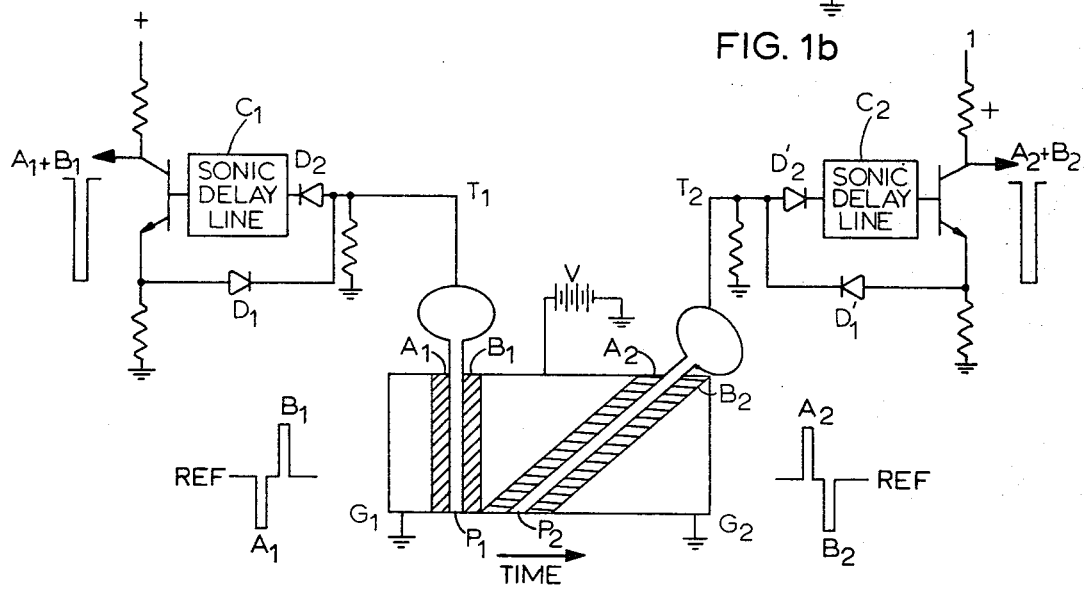
FIG. 2
IRVING R. BRENHOLDT
WACLAW WOJTULEWICZ
INVENTORS
BY George B. Oujevolk
ATTORNEYS June 18, 1968  I. R. BRENHOLDT ET AL  3,388,629
DETECTION MEANS FOR STAR TRACKER
Filed Nov. 7, 1963 7 Sheets-Sheet 2

IRVING R. BRENHOLDT
WACLAW WOJTULEWICZ
INVENTORS

BY George B. Oujevolk

ATTORNEYS

June 18, 1968  I. R. BRENHOLDT ET AL  3,388,629
DETECTION MEANS FOR STAR TRACKER
Filed Nov. 7, 1963  7 Sheets-Sheet 3

IRVING R. BRENHOLDT
WACLAW WOJTULEWICZ
INVENTORS

BY George B. Oujevolk

ATTORNEYS

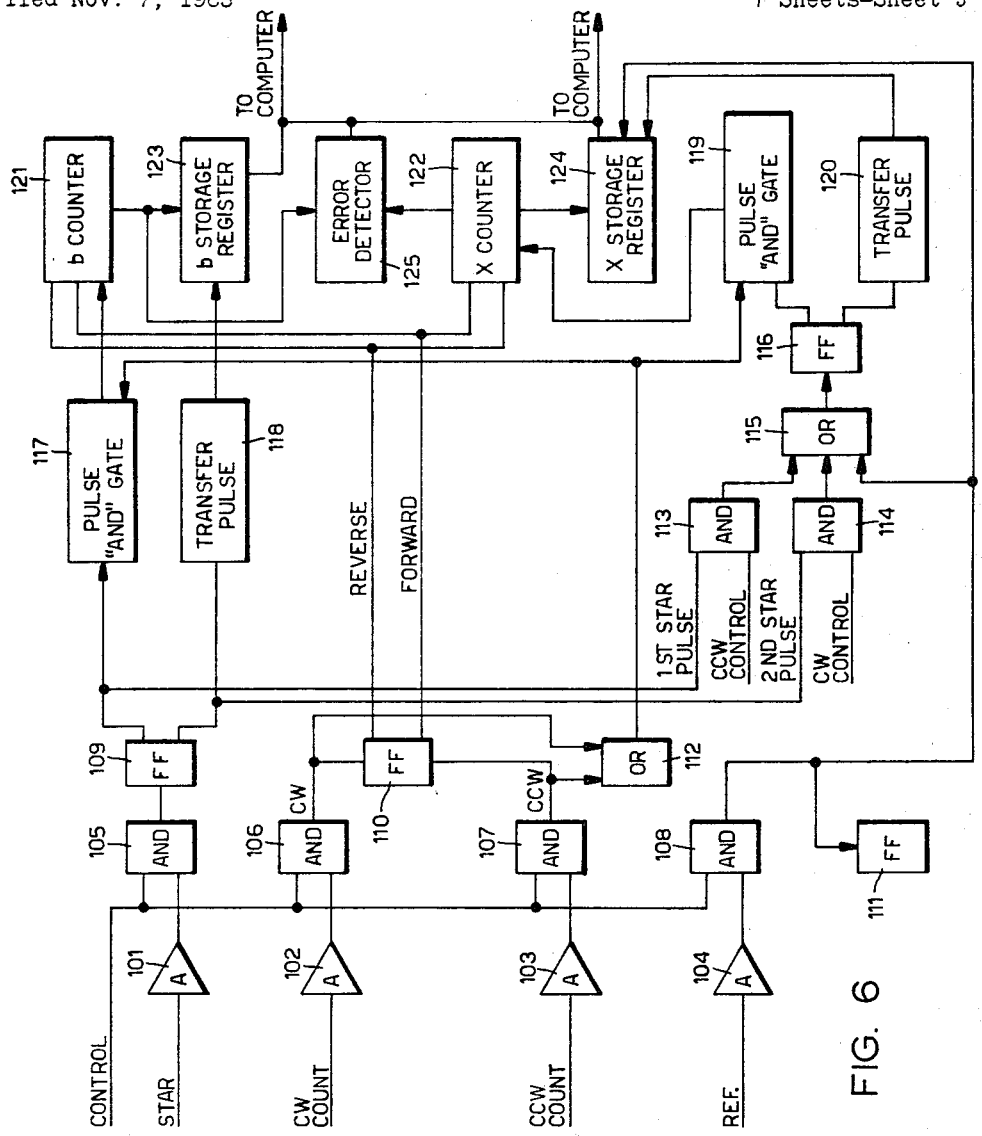
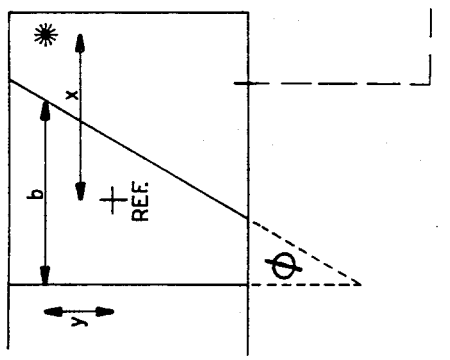
FIG. 6
IRVING R. BRENHOLDT
WACLAW WOJTULEWICZ
*INVENTORS*
BY George B. Ojevolk
ATTORNEYS June 18, 1968 I. R. BRENHOLDT ET AL 3,388,629

DETECTION MEANS FOR STAR TRACKER

Filed Nov. 7, 1963 7 Sheets-Sheet 6

IRVING R. BRENHOLDT
WACLAW WOJTULEWICZ
INVENTORS

BY George B. Oujevolk

ATTORNEYS

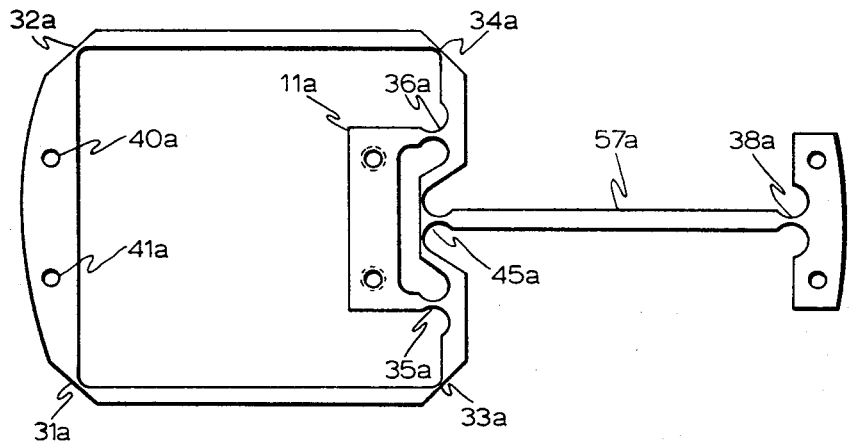
FIG. 13
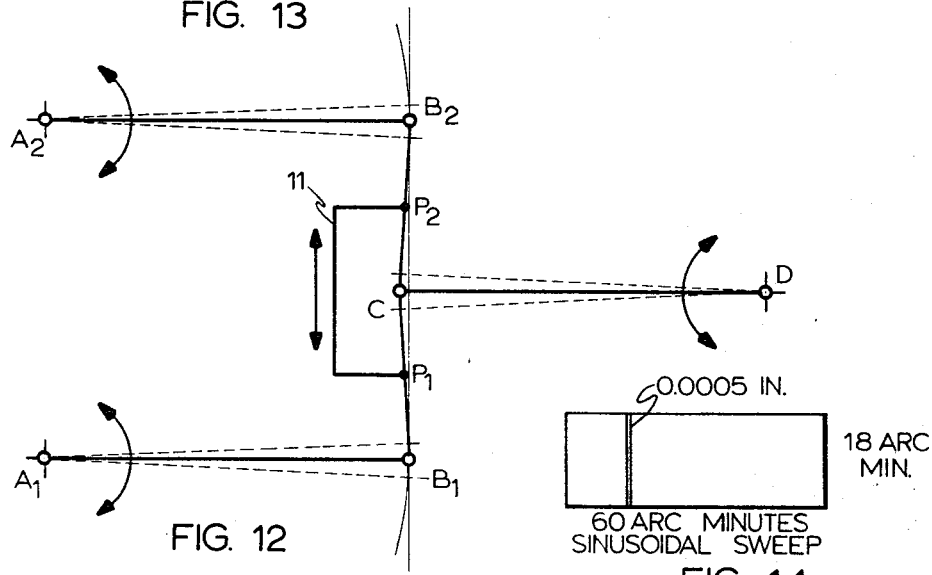
FIG. 12
FIG. 14
FIG. 15
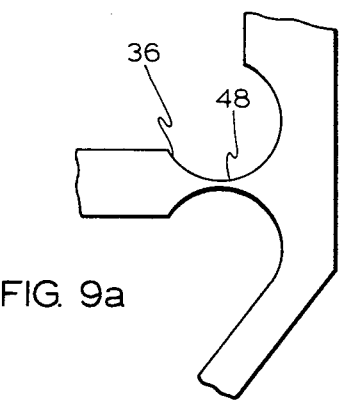
FIG. 9a
IRVING R. BRENHOLDT
WACLAW WOJTULEWICZ
INVENTORS
BY *George B. Oujevolk*
ATTORNEYS United States Patent Office 3,388,629
Patented June 18, 1968

3,388,629
DETECTION MEANS FOR STAR TRACKER
Irving R. Brenholdt, Montclair, and Waclaw Wojtulewicz, Paterson, N.J., assignors to General Precision Inc., Little Falls, N.J., a corporation of Delaware
Filed Nov. 7, 1963, Ser. No. 322,135
3 Claims. (Cl. 88—1)

ABSTRACT OF THE DISCLOSURE

A sensing panel having V-slit or double V-slit sensing means is moved in a rectilinear scanning motion at right angles to a focused star image. The output of the sensing means is fed to an encoder and a logic system which provides the location of the star image in azimuth and elevation. If a double V-slit is used, a center tap is provided between each pair of slits and a time delay arrangement adds the output from each slit. The double V-slit arrangement increases the signal to noise ratio by doubling the signal while the noise increases only by a factor corresponding to about the square root of two.

---

The present invention relates to detection means for star trackers and more particularly to detection means which can sense a body in the sky such as a star or planet against a background of broad daylight.

During the daylight hours, the stars and planets (and as used herein the term star includes planets) are all in their regular places but cannot be seen against the considerable background noise of the daylight sky. Although sun and moon trackers can be readily provided, star trackers which can be used at any time are difficult to provide, and, although attempts have been made to provide star detectors useful during both day and night, none, as far as we are aware, have even been completely successful.

Therefore, an object of the present invention is to provide a star detector useful with a star tracker which can be used at all times of clear weather.

Another object of the present invention is to provide a star detector arrangement which will also provide the location of a star detected.

Still another object of the present invention is to provide a straight-line motion means to move the star detector.

The invention in its broadest aspects contemplates a star detector having at least two very narrow sensing panels disposed at an angle, herein referred to as V-slit. The sensing panels are moved in a rectilinear scanning motion and the location of the star in azimuth and elevation is then determined by computer logic means based upon the crossing time between panels. Although only one panel is needed to detect the star and define its location in one coordinate, the angular arrangement is used to define its location in a second coordinate at right angles to the first.

Other objects and advantages of the invention will become apparent from the following description taken in conjunction with the accompanying drawing in which:

FIGURE 1a is a perspective view of a portion of one of the detectors contemplated herein at a certain time period;

FIGURE 1b is a like perspective view of the detector shown in FIGURE 1a but at a different time period;

FIGURE 2 is a theoretical explanation of an improved version of the invention illustrated in FIGURES 1a and 1b;

FIGURE 6 is a schematic and block diagram of a computer logic arrangement which can be used with the star detector contemplated herein;

FIGURE 9a shows a constructional detail of FIGURE 9;

FIGURE 12 is a schematic illustration of the application of the theory illustrated in FIGURE 10 to a straight-line motion apparatus;

FIGURE 13 is a top view of another embodiment of a straight-line motion apparatus using the principles given in FIGURE 12;

FIGURE 14 is a graphic explanation used in connection with Example I; and

FIGURE 15 is a graphic explanation used in connection with Example II.

Figure 3:
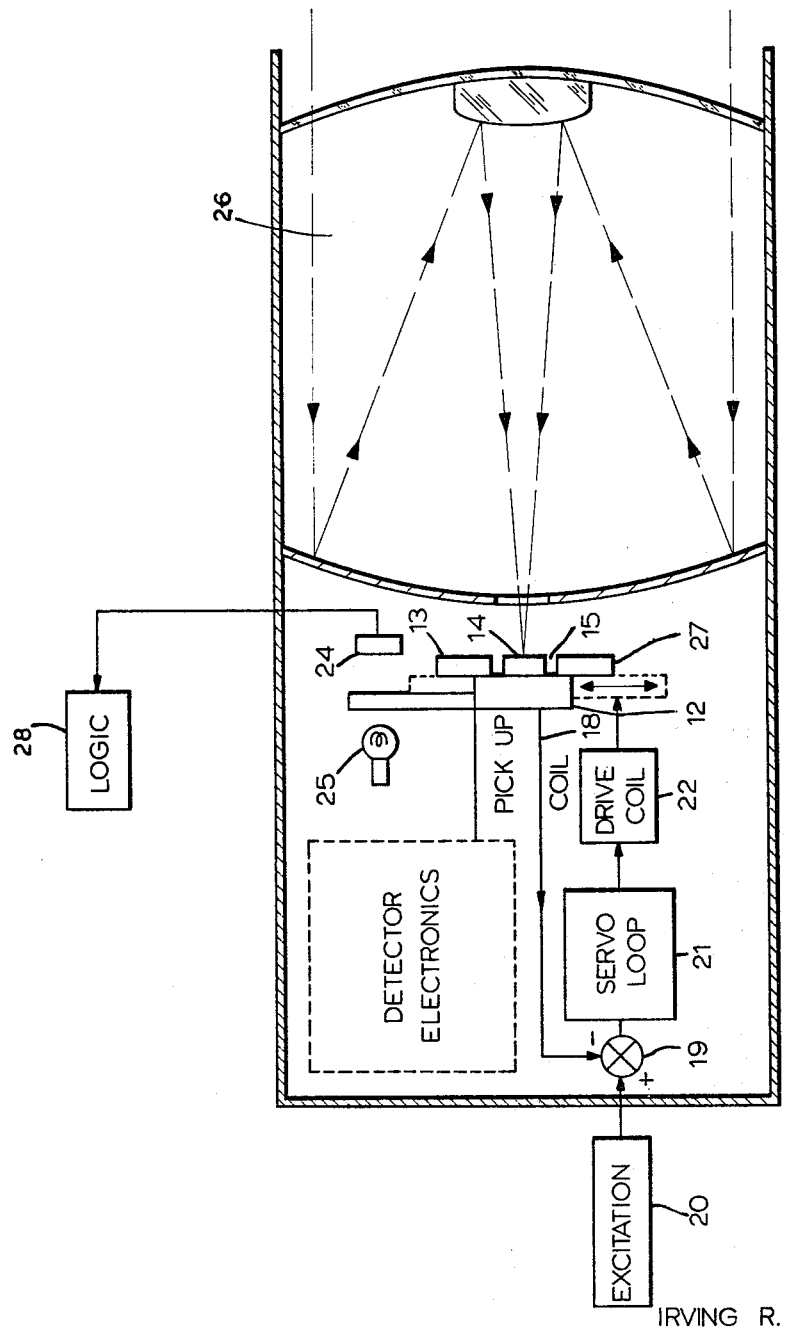
FIGURE 3 is a cross-sectional schematic and block diagram of one of the detectors contemplated herein together with other components required for detection and star location.
Figure 4:
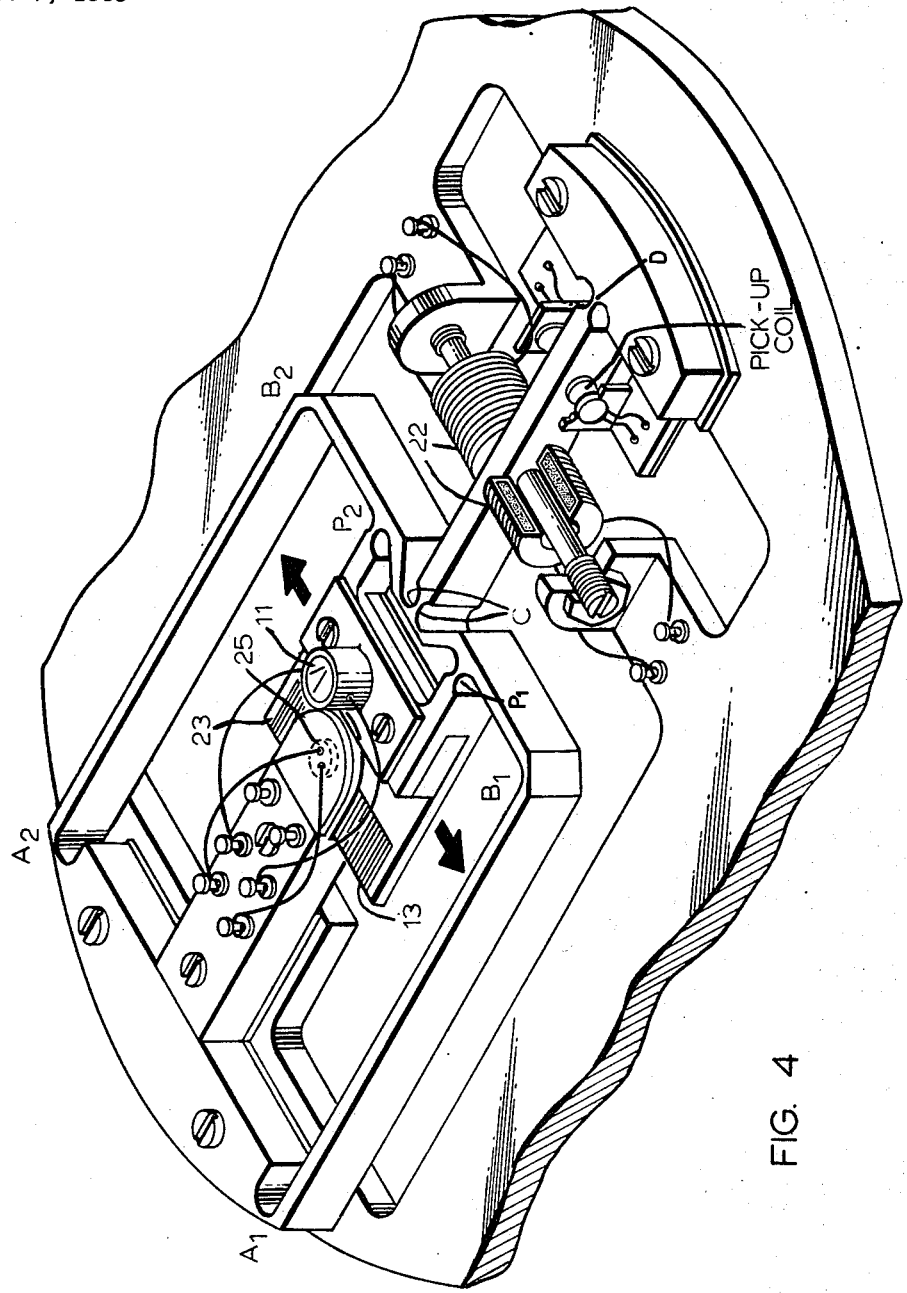
FIGURE 4 shows in a front perspective view the arrangement shown in FIGURE 3 giving constructional details.
Figure 5:
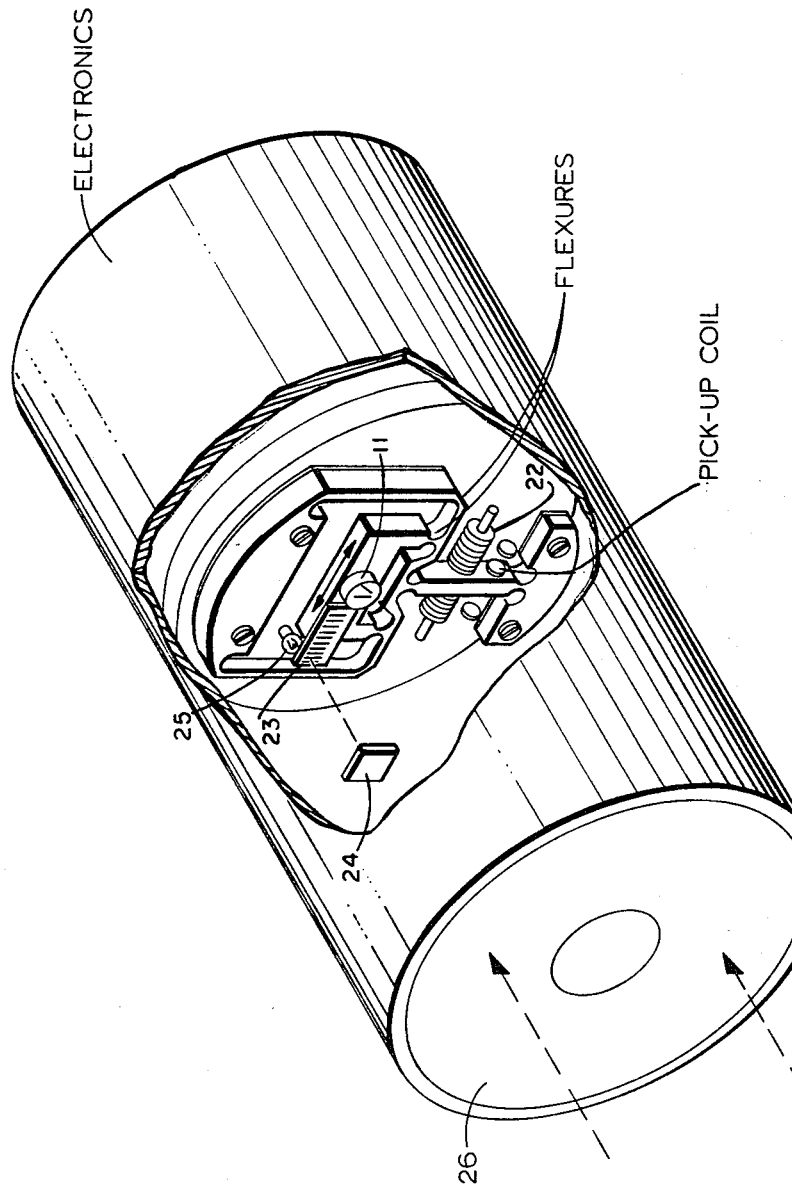
FIGURE 5 illustrates in perspective the arrangement of FIGURE 4 mounted in a tracker housing.

Generally speaking the present invention contemplates using angularly disposed detection slit panels as shown in FIGURES 1a and 1b made of photoconductive material which will peak at the wave length of the star to be detected, of about the image width of the star. The detector is mounted in the star tracker housing as shown in FIGURE 5 and moved in a rectilinear straight motion by the mechanical arrangement depicted in FIGURES 7–13. When the star image signals from the photoconductive slit panels are fed to the logic system illustrated in FIGURE 6, the position of the star is determined. As the present invention deals with extremely small values, the apparatus described herein is a combination of components each designed to provide the maximum useful output with a minimum noise. Each of the particular components must operate within extremely critical limits and operation outside of its limits by any of the components usually results in failure of the mission. The critical importance of the parameters is shown by Examples I and II. In Example I the signal to noise ratio is 26; in Example II it is 6:1.

By using the double V-slit detector shown in FIGURE 2, the useful signal is further improved.

Broadly stated, therefore, the present invention provides for a star detector useful in a star tracker and comprises, optical means to provide a star image, photoconductive V-slit sensing means of a predetermined angle, disposed so as to receive said image, normally non-conductive but turning conductive and passing a peak output when hit by rays of a particular star to be tracked, the width of the slits corresponding approximately to about the width of the star image, and mechanical means coupled to the V-slit sensing means imparting a scanning motion at right angles to one of the slits at a rate of speed such that the time interval of a slit crossing the star image corresponds to about the rise time of the sensing means going from the non-conductive state to the maximum conductive state. The output from the sensing means is fed to a logic arrangement which will provide the location of the star along X and Y coordinates.

In carrying the invention into practice, there is employed in one embodiment a V-slit detector 11. The detector has a cadmium selenide sensing means 12 and a mask 13 with two 0.0005 inch slits 14 and 15 disposed at a predetermined known angle. If an oscillating straight-line motion as shown by the arrow is applied to the detector at right angles to one of the slits, a signal will be produced each time a focused light ray 16 from a star strikes one of the slits. The straight-line motion should be at right angles to one of the slits.

The light rays from a star are focused by optics 26, i.e., a Cassegrainian telescope on the cadmium selenide sensing means 12. These sensing means are moved in an oscillating straight-line motion by the mechanical arrangement herein described and this arrangement also includes a pickup coil 18 acting on a switch 19. Switch 19 feeds excitation current 20 to a servo loop 21 which in turn acts on drive coils 22 which again act on the straight-line mechanism 27 moving the detector.

The sensing means, upon receiving light from a star, provide a signal. An encoder 23 is directly mounted on the detector to eliminate readout errors due to vibration of the sensing means in the azimuth direction. The encoder 23 provides a reference pulse which can be initially aligned with the optical axis to within 2 arc-seconds. A pulse output is supplied by the encoder which has a resolution of better than 2 arc-seconds. Three output lines are provided. One supplies pulses generated during clockwise motion of the encoder; a second line generates pulses during the counterclockwise motion of the encoder. The third line supplies a reference pulse which will determine the start of the count. The reference pulse coincides with the optical axis, and is supplied by a light source 25 acting on a photocell 24 associated with the encoder. The output of the encoder is then fed to logic system 28. The system must convert the data from an optical system to a form acceptable to a computer. The system inputs from the optics detector and the encoder are the star pulses, the reference pulse, the clockwise (CW) count and the counter-clockwise (CCW) count. A control signal is also provided. The two V-slits are moved across the aperture first in a CW direction, then in a CCW direction. The encoder supplies count pulses proportional to the distance traveled by the slits. These pulses are on two separate lines, one for the CW motion and one for the CCW motion. When the vertical slit passes through the reference point, a reference pulse is produced. When either slit passes over the image, a star pulse is produced. Coordinate X is obtained directly by counting the number of CW or CCW pulses between the time of the reference and the time of the star pulse. Coordinate Y is measured in the following manner. The distance b between slits at the image elevation is measured by counting the pulses that occur while the image passes from one slit to the other. The vertical distance from the apex of the angle formed by the slits to the image is equal to $b/\tan \theta$. Then, $$Y = \frac{b}{\tan \theta} - K$$

where K is the vertical distance from the vertex to the reference point, where Y is equal to 0. Both b and x data are stored in registers until the next set of data is obtained.

A check of the accuracy of the data taken in the CW direction is made by taking the same data in the CCW direction and comparing the two in an error detector. If no error exists, the data in the b and x storage registers are supplied to the associated computers.

As shown in FIGURE 6, the signal from the star, the CW count, the CCW count, and the reference signal are fed into the system through squaring amplifiers 101, 102, 103, 104, biased to minimize incoming noise pulses, to pulse "and" gates 105, 106, 107, 108 controlled by the "system on" or power, which enables the system operation.

The star signal entering amplifier 101 goes to "and" gate 105 where it is fed to flip-flop 109 to produce a gate signal which will last from the first star pulse to the second star pulse in either the CW or the CCW direction. This flip-flop is reset at the beginning of the CW scan and again at the beginning of the CCW scan to prevent an error due to the presence of only one star pulse in a given scan. This is the b data.

Both the CW count and the CCW count, from amplifier 102, "and" gate 106; from amplifier 103, "and" gate 107, are supplied to flip-flop 110 to determine the direction of the count of the forward and reverse counters for both the b and x counters. The counters count in the forward direction during the CW scan and in the reverse direction in the CCW scan.

Likewise, the CW and CCW count signals are fed to "or" gate 112 which produces an ouput for either the CW or CCW count. The reference signal is fed through amplifier 104, "and" gate 108, to flip-flop 111 so as to determine the polarity of the x count.

If during the CW scan the reference pulse is received before the second star pulse, the polarity of x is positive. If the reference pulse is received after the second star pulse, the polarity of x is negative. This information is treated as x data and clocked into a flip-flop in the x storage register.

We now have therefore a star signal fed to flip-flop 109 and the count fed to "or" gate 112. These signals are both applied to a pulse "and" gate 117 which enables the b counter 121. At the end of the count there is a transfer pulse provided by component 118 (actually another "and" gate). This transfers the b counter information to the b storage register 123.

In a like manner the x counter is enabled by pulse "and" gate 119 responsive to "or" gate 112, and the information from the x counter is transferred to the x storage register by a transfer pulse from component 120. The x counter receives inputs from "and" gates 113 and 114. These produce an output from the first star pulse when scanning in the CW or CCW direction respectively. These outputs are fed to an "or" gate 115 to produce an output either whenever the reference pulse is received or when an output is present in "and" gate 113 or 114. The output from "or" gate 115 to flip-flop 116 to produce a signal which is as long as the time from the second star pulse (when scanning in the CW direction) to the reference pulse, or the time from the first star pulse (when scanning in the CCW direction) to the reference pulse. The width of this "gate" corresponds to the x data. This flip-flop 116 is reset at the beginning of the CW scan and again at the beginning of the CCW scan to prevent an error due to the presence of only one star pulse in a given scan.

In this way, the signals required are transferred to the b and x counters 121 and 122. These are forward-reverse binary counters of 11 bits each. The counters count in the forward direction during the CW scan and in the reverse direction during the CCW scan. Since the CW scan count equals (or should equal) the CCW scan count, the count should be zero after one CW and CCW scan. Failure to achieve zero is detected by the error detector 125 and readout to the external computers is prevented.

The data in the b and x counters is transferred by transfer pulses from components 118 and 120 to the b and x storage registers 123 and 124. In practice these have 11 bits for b and 12 bits for x, the extra x bit being the polarity sign. Data clocked into these registers is held there until the next CW–CCW cycle. The outputs from these registers are fed to the computers unless stopped by the error detector 125.

If the detector of FIGURES 1a, 1b and 2 was moved in a radial scan, the detector would move out of the focal plane at the ends of the radial scan. But, more important is the variation in scanning slit width as the slit traverses an arc. At the ends of the arc traveled, the reduction in slit width causes a decrease in signal level. The effect is similar to imposing a modulated background on the star signal. As previously pointed out the incoming signal is a small value to begin with, the decrease in signal level caused by using a radial scan will as shown in the examples given herein make a great difference in the signal to noise ratio, and this difference may mean the difference between success or failure, particularly under heavy noise conditions. Therefore, it is extremely advantageous to scan in a straight-line motion.

Figure 7:
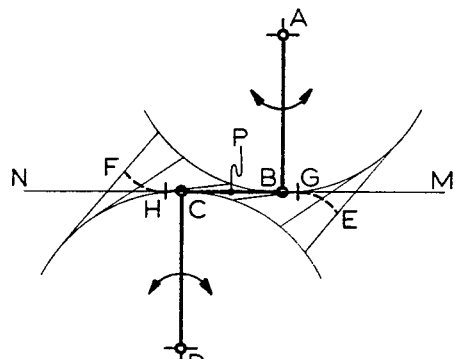
FIGURE 7 is a geometric explanation of the straight-line motion herein contemplated.

In its simplest concept, straight-line motion as shown on FIGURE 7, shows arms AB and CD, equal, parallel and in opposite directions. The link BC is perpendicular to the arms in the midposition, and the point P is at the middle of the link BC. It will be noted that the full path EF of the point P coincides approximately with the straight line MN within the limits GH.

Figure 8:
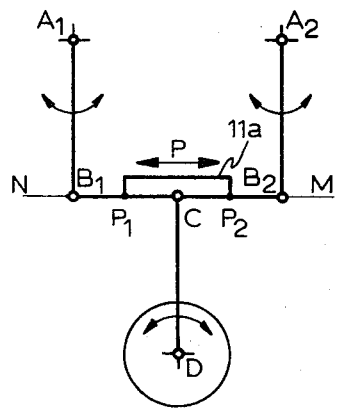
FIGURE 8 is a schematic illustration of the theory illustrated in FIGURE 7 applied to a straight-line motion apparatus.

In FIGURE 8 is shown the principle of the precision straight-line motion mechanism. The portion of the mechanism $A_1$, $B_1$ C, D, $A_2$, $B_2$ is two Watt's straight-line mechanisms, arranged in a symmetrical way, so that arm CD is common to both of them.

As described in the previous paragraph, the points $P_1$ and $P_2$ are moving in a practically straight line. Because the arms of the lefthand side are symmetrical to the right-hand side ($A_1B_1=A_2B_2$, $B_1C=DB_2$ and CD is common), points $P_1$ and $P_2$ will move with the same rate. Then the platform P, which joins the two points $P_1$ and $P_2$, will move in a straight line.

Figure 9:
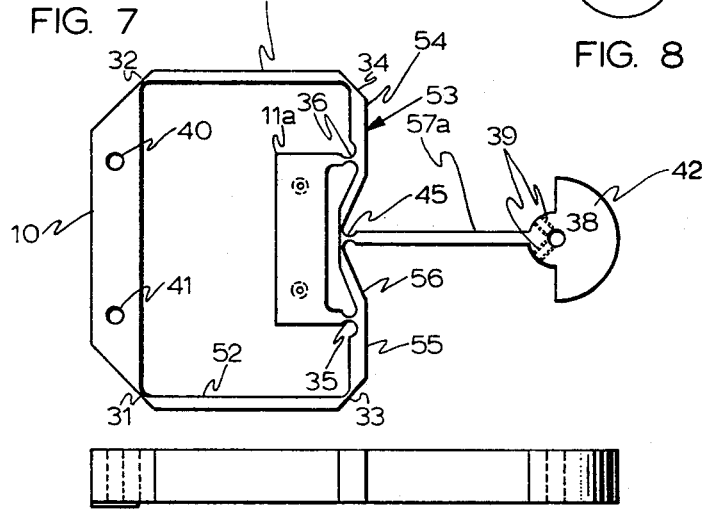
FIGURE 9 is a top view of one embodiment of a straight-line motion apparatus useful with the detector of FIGURES 1 and 2 using the principles given in FIGURE 8.

An illustration of the mechanism in FIGURE 9 shows a concrete embodiment of the concept. The mechanism essentially consists of the same elements shown in FIGURE 8, point $A_1$, being joint 31; $A_2$, joint 32; $B_2$, joint 34. Fixed joints 31 and 32 are connected by a solid link with two mounting holes 40, 41. Third fixed point D is joint 38 located on the shaft of the motor drive. Two set screws 39 facilitate the clamping to drive shaft. Points $P_1$ and $P_2$ are joints 35 and 36.

Because the travel of platform 11 is an oscillating motion of limited amplitude ±.125 (small travel angle of each link), and accuracy demands zero backlash and frictionless action, flexure joints are especially advantageous.

Since the control linkages adjacent to a flexure are elastically connected, the problems of wear, lubrication, structural soundness, and vibration are either eliminated or more easily controlled. The counterweight 42 is for dynamic balance of the system in case of shock or acceleration.

A properly designed flexure will function almost indefinitely. Flexures retain rigidity in the desired directions without the use of additional stabilizing members. Flexure joints provide: freedom of movement in only one permissible plane; elasticity to permit controlled deflection and compensate for the elastic restoring force.

With friction and play already negligible, the self-compensated flexure approaches an almost ideal bearing for pivots. Stiffness of a flexure is influenced by the ratio of thickness to length. Thickness cannot be reduced freely without compromising strength. However, flexibility can be gained by addition of a flat section between circular portions of the contour.

Figure 10:
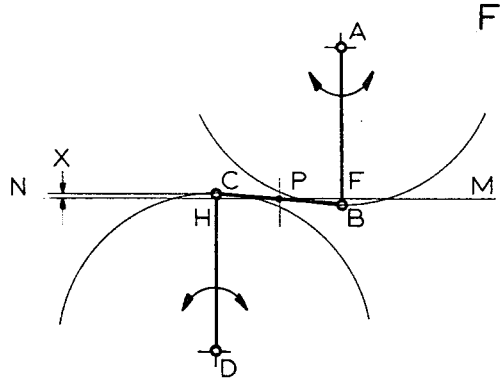
FIGURE 10 is a geometric explanation of a modified version of the motion shown in FIGURE 7 at one time period.
Figure 11:
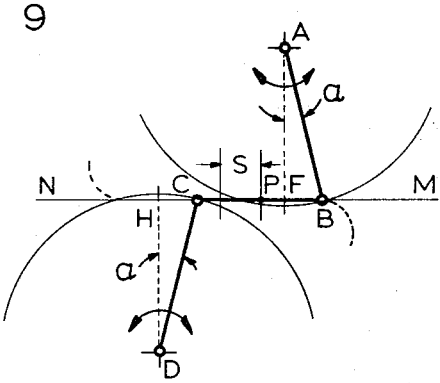
FIGURE 11 is a geometric explanation of the modified version of FIGURE 10 but at a different time period.

The four-bar linkage may also be made in accordance with the principles shown in FIGURES 10 and 11 showing a linkage so averaged as to guide a point P located on the connecting rod in a complex path, a part of which, NM, is approximately a straight line perpendicular to the parallel position of the cranks AB and DC.

The following equations will serve as a guide in laying out a linkage. Given the location of the fixed axes A and D, the position of the line NM along which the point P is to be guided, and the desired length of stroke S. To find AB, BD and DC, and locate the point P: ("Elements of Mechanism," par. 5–23, p. 149, V. L. Doughtie et al.).

Draw AF and DH perpendicular to NM. Then $$AB = AF + (S^2/16AF)$$

$$DC = DH + (S^2/16DH)$$

Join B and C, and P will be the point where BC cut NM. Note also that $$\frac{FB}{HC} = \frac{FP}{HP} = \frac{BP}{CP}$$

Straight-line oscillating motion mechanism as presented on FIGURE 12 is actually a harmonic transformer since angular harmonic motion applied to the input link is transformed into linear motion of platform P.

According to the dimensions of its connecting links, the harmonic transformer establishes a mathematical relation between the angular position of the input link and the translatory position of the platform P.

The mechanism presented on FIGURE 13 essentially is the same in function as in FIGURE 8 and the corresponding parts have been similarly numbered namely 31a, 32a, 33a, 34a, 35a, 36a, 38a, 40a, 41a.

The only difference that exists is that a shaft 38 of actuating motor is substituted by flex 38a. Also this mechanism is completely free of backlash. The input link can be any link, CD, $A_2B_2$, $A_1B_1$ or direct linear input to the platform 11.

In connection with the construction of the mechanical arrangements shown in FIGURES 9 and 13, although in practice these devices are made of a stainless steel, the particular metal, or even plastic material required for their manufacture, can be readily determined depending on the other components of the system and the weight allocated in the missile system to the tracker package. The fabrication of these parts is another matter. Joints 31, 32, 33, 34 of FIGURE 9 and the corresponding joints 31a, 32a, 33a, 34a of FIGURE 13 are lapped flexure joints. These present no problem. Joints 38a, 45a of FIGURES 13 and 45 of FIGURE 9 are bored joints, i.e., bored on a jig borer. The arcs are center to center and tangent to the line CD. Joints 34, 35, 34a, 35a are not the same as joints 38a, 45a and 45. As shown in FIGURE 9a, there is a slight beam 48 so that the joint is not formed by two arcs but by two double arcs with a small beam in between. This permits greater flexibility of movement of the detector 11. Therefore, in the embodiments of FIGURES 9 and 13, the straight-line motion arrangement comprises a straight fixed member 50 and 50a held towards its outer ends 31, 31a and 32, 32a at least at two points 40, 40a and 41, 41a. A pair of arm members 51, 52 and 51a, 52a are disposed substantially at right angles to the fixed member, each coupled at one end to the outer ends of the fixed member by lapped flex joints. Opposite the fixed member is a moving member 53, 53a which includes two outer portions 54, 55 and 54a, 55a, coupled to the other end of one of said arm members in a plane parallel to said fixed member by lapped flex joints, and a V-shaped central portion 56, 56a, the apex of the V being towards said fixed member. A third arm member 57, 57a of a length equal to said other two arm members, one end of said third arm member being flex-coupled to said V at the apex thereof by a pair of bored arcs flexure joints. This third arm extends away from said fixed member at about right angles thereto, the other end of said third arm being pivotly fixed either by a pin or another pair of bored arc flexure joints. The detector support member 11a is mounted, at points intermediate the apex of the V, and the pair of arms, on the outer portions of the moving member. Here, the coupling is by a double pair of bored arc flexure pivots to insure flexibility. The only difference between the embodiments of FIGURES 9 and 13 is that in the embodiment of FIGURE 9, the junction points of the flexure joints 33, 34 and 45 are on a straight line whereas in the embodiment of FIGURE 13, the junction points of joints 33a and 34a are on a line parallel to the fixed member while junction point 45a is slightly above that line towards the fixed member. By means of this arrangement, backlash is eliminated. This is important because in kinematic analysis, the output is usually assumed to be a unique function of input. However, two factors combine to alter this idealized relationship: backlash caused by accumulated clearances in the mechanism joints, and elasticity of components. Those factors change actual output characteristics, unless compensated by preloading or by special device such as "frontlash." Backlash is inevitable in any old type mechanical system. Even in a one-of-a-kind mechanism, there is usually clearance in the kinematic pairs to permit assembly. When parts are made in mass production, the clearance is even larger. The clearance, and thus backlash, can be reduced by using selective assembly. But, this increases the expense of assembly and complicates the problem of replacement parts. Backlash of the mechanism changes in usage with time by the simple fact of wear, and mostly unpredictable accuracy with the age, so the initial output also changes. Large backlash causes increased dynamic loads. Thus, a mechanism having large backlash initially will get worse faster than a mechanism with small initial backlash.

For the purpose of giving those skilled in the art a better understanding and appreciation of the invention, the following illustrative examples are given. (For source material refer to Robert H. Baker, "Astronomy," D. Van Nostrand Co., 1938, p. 1324, et seq., Magnitude of Stars.) As will be seen from the examples with the device described in Example I, there is a signal to noise ratio of 26.6 but with the device of Example II the signal to noise ratio is only 6.1.

EXAMPLE I (FIGURE 14)

Total field of scan=10 arc-min. x 20 arc-min. with linear sweep.

Period of one-half linear cycle is 5 seconds, i.e., 5 seconds each way across. The rate of travel is therefore .066 in./5 sec.=0.13 in./sec.

Focal length=11.5 inches, 20 arc-min.=.066 inch.

Present slit width=.0005 inch=$\frac{1}{400}$ degree=0.15 arc-min.=9 arc-sec.

Transit time of slit across an ideal point is $5 \times 10^{-4}/1.3 \times 10^{-2}$=.0385 second=38.5 millisecond. Slit area=0.15 arc-min. x 10 arc-min.=1.5 square arc-minutes.

Effective aperture=2.8 inch, area=39.6 cm.$^2$.

The response of the Cd-Se detector peaks at 7350 A. The peak is narrow, but the tails are broad and an effective bandwidth of 1000 A. will be used. Energy received from the sun is 2 calories/min. per cm.$^2$ (all $\lambda$).

1 calorie=$4.2 \times 10^7$ ergs therefore:

Solar flux incident on earth=$1.4 \times 10^6$ ergs/sec. per cm.$^2$ (all $\lambda$).

Visual magnitude of sun is $-26.7$.

A G2$\overline{V}$ star of 2.2 visual magnitude is 28.9 magnitudes fainter; i.e. ($-26.7+2.2=28.9$), it is fainter by a factor $3.6 \times 10^{11}$.

The incident flux from a 2.2 magnitude G2$\overline{V}$ star is $1.4 \times 10^6/3.6 \times 10$ sec.=$3.89 \times 10^{-6}$ ergs/sec. per cm.$^2$ (all $\lambda$).

Using Planck's law $$E_{(\lambda)} = \frac{3.7 \times 10^{23} \lambda^{-5}}{\exp\left(\frac{1.43 \times 10^7}{\lambda T}\right)^{-1}}$$

ergs/sec. cm.$^2$ per m$\mu$ for $\lambda$ in m$\mu$, T in degrees Kelvin. In this case, "per cm.$^2$" means per unit area of the black body itself. We are interested here only in relative amount of energy in different parts of the spectrum.

Total energy is given by Stefan-Boltzmann law:

$$E_{(total)} = \sigma T^4 = 5.7 \times 10^{-5} T^4 \text{ergs/sec. cm.}^2$$

for T in degrees Kelvin

Sun=G2$\overline{V}$=approximately 5750° K.

Polaris=F81b=approximately 5400° K.

For 5750° K.

$$E_{(total)} = 5.7 \times 10^{-5} \times 1095 \times 10^{12} = 6.25 \times 10^{10}$$

ergs/sec. cm.$^2$

For 5400° K.

$$E_{(total)} = 5.7 \times 10^{-5} \times 914 \times 10^{12} = 5.21 \times 10^{10}$$

ergs/sec. cm.$^2$

Portion of energy in visual:

Take $\lambda_{eff}$=5300 A.=530 m$\mu$ and take bandwidth=1000 A.=100 m$\mu$.

For 5750° K.

$$E_{(\lambda)} = \frac{3.7 \times 10^{23} \times (0.0418)^{-1} \times 10^{-15} \times 100}{\exp\left(\frac{2.7 \times 10^4}{5750}\right)^{-1}}$$

$$= 8.12 \times 10^9 \text{ ergs/sec. cm.}^2$$

For 5400° K.

$$E_{(\lambda)} = \frac{3.7 \times 10^{23} \times (0.0418)^{-1} \times 10^{-15} \times 100}{\exp\left(\frac{2.70 \times 10^4}{5400}\right)^{-1}}$$

$$= 6.02 \times 10^9 \text{ ergs/sec. cm.}^2$$

Portion of energy in region of sensitivity of cadmium selenide: Take $\lambda_{eff}$=7350 A.=735 m$\mu$ and take bandwidth=1000 A.=100 m$\mu$.

For 5750° K.

$$E_{(\lambda)} = \frac{3.7 \times 10^{23} \times (0.214)^{-1} \times 10^{-15} \times 100}{\exp\left(\frac{1.95 \times 10^4}{5750}\right)^{-1}}$$

$$= 6.03 \times 10^9 \text{ ergs/sec. cm.}^2$$

For 5400° K.

$$E_{(\lambda)} = \frac{3.7 \times 10^{23} \times (0.214)^{-1} \times 10^{-15} \times 100}{\exp\left(\frac{1.95 \times 10^4}{5400}\right)^{-1}}$$

$$= 4.8 \times 10^9 \text{ ergs/sec. cm.}^2$$

The corresponding fractions of the total energies are therefore:

|  | 5,750° K. (Sun) | 5,400° K. (Polaris) |
| --- | --- | --- |
| Visual, percent | 13.0 | 11.6 |
| Cd-Se, percent | 9.6 | 9.2 |
| Ratio | 1.35 | 1.26 |

Polaris is therefore redder by a factor of 1.07 on the visual/Cd-Se baseline. Input to a Cd-Se detector by a G2$\overline{V}$ star of V=+2.2 magnitude would be $$3.89 \times 10^{-6} \times 0.096 = 3.73 \times 10^{-7}$$

ergs/sec. per cm.$^2$. Input to a Cd-Se detector by Polaris (F81b, $V$=2.2 magnitude) would be $$3.73 \times 10^{-7} \times 1.07 = 4.0 \times 10^{-7}$$

ergs/sec. per cm.$^2$

Photon flux from Polaris:

Energy per photon at 7350 A. is $h\nu = hc\lambda$ $$\frac{6.55 \times 10^{-27} \times 3 \times 10^{10}}{7.35 \times 10^{-5}} = 2.67 \times 10^{12} \text{ ergs/photon}$$

Number of photons:

$$\frac{4.0 \times 10^{-7}}{2.67 \times 10^{-12}} = 1.5 \times 10^5 \text{ photons/sec. per cm.}^2$$

received at the surface of the earth from Polaris.

Relation between magnitudes and photometric units:

Star of $V$=+1 magnitude at the zenith produces an illumination of $8.3 \times 10^{-7}$ lumens/meter$^2$ after atmospheric absorption 1 lumen/meter² is produced by 1 candle at a distance of 1 meter. Let source be at a distance where 1 foot subtends 1 arc-minute; i.e., at a distance of 3440 feet or 1050 meters. 1 candle then produces $$(1.10 \times 10^6)^{-1} = 0.91 \times 10^{-6}$$

lumens/meters².
Therefore, 1 candle/ft.² is $$\left(\frac{9.1 \times 10^{-7}}{8.3 \times 10^{-7}}\right) = 1.10$$

times brighter than $V = +1$ magnitude per square arc-minute.

Or, 1 candle/ft.² equals $+0.9D$ visual magnitude per square arc-minute, when observed at the earth's surface, underneath the atmosphere. Also, 0.9 candle/ft.² equals $+1.0$ visual magnitude per square arc-minute.

| Ft.-Lamberts | Candles/ft.² | Visual Mag. Per Sq. Arc-min. |
|---|---|---|
| 2.82 | 0.90 | 1 |
| 7.07 | 2.26 | 0 |
| 15.9 | 5.7 | −1 |
| 44.9 | 14.3 | −2 |
| 113 | 36 | −3 |
| 282 | 90 | −4 |
| 710 | 226 | ¹{−5 |
| 1,790 | 570 | {−6 |

¹ Daytime skies are in this range, at low elevations.

Therefore, 280 ft. lamberts = 90 candles/ft.² = −4.0 visual mag. per sq. arc-min. At 5300 A., $V = +2.2$ magnitude produces an illumination of $$3.89 \times 10^{-6} \times 0.130 \times 10^{-2} = 5.06 \times 10^{-9}$$

ergs/sec. per cm.² per mμ. For a clear sky, the energy ratio between 7350 A. and 5300 A. is 0.608. Therefore a sky of $V = +2.2$ visual mag. sq. arc.-min. produces an illumination of $5.06 \times 10^{-9} \times 0.608 = 3.07 \times 10^{-9}$ ergs/sec. per cm.² per mμ at 7350 A. due to 1 square arc-minute.

Again take the bandwidth to be 1000 A. (100 mμ) and note that −4.0 magnitude is brighter than +2.2 by a factor of 302. From a sky of −4.0 vis. mag./square arc-min. we receive from each square arc-minute $$3.07 \times 10^{-9} \times 100 \times 302 = 9.3 \times 10^{-5}$$

ergs/sec. per cm.²

*Results of Example 1*

Corresponding photon flux $$9.3 \times 10^{-5} / 2.67 \times 10^{-12} = 3.5 \times 10^{+7}$$

photons/sec.
Aperture = 39.6 cm.² and slit area = 1.5 square arc-minutes.
Actual sky flux received by detector is then $$3.5 \times 10^{+7} \times 39.6 \times 1.5 = 2.08 \times 10^9$$

photons/sec. in the Cd-Se range.
In a transit time of 38.5 milliseconds, there are $8 \times 10^7$ sky photons.
In the same interval and same band, Polaris gives $$1.5 \times 10^5 \times .0385 \times 39.6 = 2.29 \times 10^5$$

photons.
Fundamental photon $$\frac{S}{N} = \frac{2.29 \times 10^5}{(8 \times 10^7)^{1/2}} = 25.6$$

based on R.M.S.

EXAMPLE II (FIGURE 15)

Using the parameters shown in FIGURE 15 instead of those shown in FIGURE 14 causes the results shown:
Total field of scan = 18 arc-minutes x 60 arc-minutes with sinusoidal sweep. Ends of sweep where motion of sine wave is slow are not used. Useful field is therefore a little shorter than 60 arc-minutes, say perhaps 40 arc-minutes or 50 arc-minutes. Period of total sinusoidal sweep cycle is 5 seconds; i.e., 5 seconds each way across. The rate of travel across the center is a maximum and is such that, if continued linearly, would reach $90/57 \times 30$ arc-minutes = $1.57 \times 30$ arc-minutes = 47.1 arc-minutes in 1.25 seconds of time. The central rate of travel is therefore 37.7 arc-minutes per second.

Focal length = 11.5 inches = 292 mm. 1° = 0.20 inch = 5.1 mm. 18 arc-minutes = 0.060 inch = 1.52 mm.
Central rate of travel is then 0.126 inch per second.
Present slit width = 0.0005 inch = 1/400 degree = 0.15 arc-minute = 9 arc-seconds.
Transit time of slit across an ideal point is 1/252 second = 0.004 second = 4.0 millisecond. Slit area = 0.15 arc-minute x 18 arc-minutes = 2.7 square arc-minutes.
Effective aperture = 2.75 inch = 70 mm. Area = 38 cm.².

*Results of Example II*

Corresponding photon flux $$= 9.3 \times 10^{-5} / 2.67 \times 10^{-12} = 3.5 \times 10^{+7}$$

photons/sec. per cm.² per square arc-minute.
Aperture = 38 cm.², and split area = 2.7 square arc-minutes.
Actual sky flux received by the detector is then $3.5 \times 10^{+7} \times 38 \times 2.7 = 3.6 \times 10^9$ photons/sec. in the cadmium selenide range.
In a transit time of 4 milliseconds, there are $1.44 \times 10^7$ sky photons.
In the same time interval and same band, Polaris gives $1.50 \times 10^5 \times 0.004 \times 38 = 2.3 \times 10^4$ photons.
Fundamental photon $$\frac{S}{N} = \frac{2.3 \times 10^4}{(1.44 \times 10^7)^{1/2}} = 6.1$$

based on R.M.S.
Comparison of results of Examples I and II:

EXAMPLE I

| | |
|---|---|
| Scan rate | 5 second linear sweep ($f = .1$ c.p.s.). |
| Field-of-view | 20 arc-minutes by 10 arc-minutes. |
| Slit width | 0.0005 inch. |
| Effective optics diameter | 2.82 inches. |
| Velocity of travel for 20 arc-minute field and 5 sec. linear sweep | .066 inch/5 sec. = .013 inch/sec. |

EXAMPLE II

| | |
|---|---|
| Scan rate | 2.5 second sinusoidal sweep ($f = .2$ c.p.s.) |
| Field-of-view | 60 arc-minutes by 18 arc-minutes. |
| Slit width | 0.0005 inch. |
| Effective optics diameter | 2.75 inches. |
| Velocity of travel for 60 arc-minute and 2.5 sec. sinusoidal sweep | 0.12 in./sec. |

Working from a fundamental photon signal-to-noise of 6 signal-to-noise varies as:
(a) Square root of observation time . . . and since the slit width was the same in both cases, the velocity ratio can be taken:
Correction factor is:

$$0.12 \text{ inch/sec.}/0.013 \text{ inch/sec.} = 3.0 \ (C_1)$$

(b) Inverse of square root of slit area, and since slit width was the same in both cases, ratio of elevation angular dimensions can be taken:

Correction factor is:

10 arc-minutes/18 arc-minutes=1.35 ($C_2$)

(c) Linear as effective optics diameter:
Correction factor is:

2.82 inches/2.75 inches=1.03 ($C_3$)

$S/N \times C_1 \times C_2 \times C_3$=fundamental photon signal-to-noise for parameters used in examples.

6/1×3.0×1.35×1.03=25:1.

From the foregoing examples it can be seen that using presently available conventional optics, the image width of a star such as Polaris is about 0.0005 inch. A slit of slightly less than this width would eliminate the rise time and supply a better peak. However, the problem is to effectively and efficiently fabricate a slit of 0.0005 inch. If the field of scan is 10 arc-seconds x 20 arc-seconds, with a cadmium selenide detector there should be a sweep period of 5 seconds for one linear half cycle, i.e., 5 seconds each way across. With a slit width of 0.001 inch or double the star image diameter the transit time per linear half cycle should be double or 2½ seconds each way across.

The useful signal can be somewhat improved by the arrangement of FIGURE 2. Here, there is shown a double V-slit detector, each slit being as close to the star image width of 0.005 inch. Thus, there are two vertical slits, $A_1$ and $B_1$ and two transverse slits, $A_2$ and $B_2$, each about 0.0005 inch. These slits form the sensing means and are separated by conductive panels $P_1$ and $P_2$ also about 0.0005. Between the slits and from each panel $P_1$ and $P_2$ is a center tap $T_1$ and $T_2$. Each center tap leads to a voltage doubler arrangement having a delay line and two opposed diodes. Thus, tap $T_1$ leads to delay line $C_1$ having on the output side diodes $D_1$ and $D_2$; tap $T_2$ leads to delay line $C_2$ having on the output side diodes $D_1'$ and $D_2'$. The output is amplified by an NPN transistor. Voltage is fed to the center of the detector from a source V. The circuit is completed by grounding the ends of the detector at $G_1$ and $G_2$.

The center taps $T_1$ and $T_2$ between panels $A_1$, $B_1$ and $A_2$, $B_2$ make the panels act somewhat analogous to a potentiometer. Basically, the sensing panels are resistors which conduct when hit by the proper star signal. As the star image crosses panel $A_1$, there is a negative output from the center tap to diode $D_2$; the signal is delayed in delay line $C_1$. Meanwhile, there is a positive output from crossing $B_2$ to diode $D_2$. This passes without delay through diode $D_1$ so that the output signal to the transistor amplifier is almost the sum of $A_1+B_1$. As the star image crosses $A_2$ there is a positive output similar to when it crossed $B_1$ and as it crosses $B_2$ there is a negative output similar to when it crossed $A_1$ and these outputs are led to diodes $D_1'$ and $D_2'$ through delay line $C_2$ to the transistor amplifier. With the single C-slit arrangement, the width of the signal is from the reference line to $A_1$ and to $A_2$. By the double V-slit center tap arrangement, the effective width of the signal is from $A_1$ to $B_1$. Therefore, the signal is doubled but the noise increases only by $\sqrt{2}$. Effectively this arrangement therefore has all the advantages of the 0.001 inch slit and none of the disadvantages with little complications in the electronics. The logic arrangement is the same as for the single V-slit arrangement. In addition to theoretically doubling the output, this arrangement minimizes background fluctuations due to ionized gas surrounding a missile in the atmosphere and also minimizes any noise from the optical system Cassegrainian telescope.

In describing the present invention, attention has been focused on the principal inventive features so as to avoid giving lengthy details regarding matters well within the capabilities of those skilled in the art. Thus, the logic arrangement of FIGURE 6 is shown mostly in block diagram rather than in more detailed schematic form. Although the present inventors are not aware of a logic system identical with that of FIGURE 6, the design of such a system should be well within the capabilities of those skilled in the art once the means for supplying star signals are available so that the explanation of FIGURE 6 is given only to enable such persons to build the apparatus described herein. In the final analysis the most important problem is to obtain usable signals from a star under daylight noise conditions; once usable signals can be obtained from the star, those skilled in the art should be able to properly amplify the signals and locate the signal source on X and Y coordinates and the V-slit system herein described offers distinct advantages for accomplishing this. The problem therefore is to obtain signals rather than what to do with the signals after they have been obtained.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

What is claimed is:

1. A rectilinear scanning motion arrangement comprising in combination, a straight fixed member;
    a pair of arm members disposed substantially at right angles to said fixed member each flex-coupled at one end to the outer ends of the fixed member and defining a plane with said fixed member;
    a moving member opposite the fixed member in said plane including two outer portions flex-coupled to the other ends of said arm members and a V-shaped central portion, the apex of the V being towards said fixed member; and,
    a third arm member in said plane of a length equal to said other two arm members, one end of said third arm member being flex-coupled to said V at the apex thereof, said third arm member extending away from said fixed member at about right angles thereto, the other end of said third arm being coupled to a fixed point.

2. A star detector useful in a star tracker, comprising in combination,
    optical means to focus the image of a star;
    a V-slit detector having at least two photoconductive slit sensing means at a predetermined angle, disposed as to receive said image, normally non-conductive but turning conductive and passing a peak output when hit by rays of said star to be tracked, the width of the slits corresponding approximately to about the width of the star image;
    mechanical means to impart a straight-line motion to said sensing means including a straight fixed member; a pair of arm members disposed substantially at right angles to said fixed member, each flex-coupled at one end to the outer ends of said fixed member, defining a plane therewith; a moving member opposite the fixed member in said plane including two outer portions flex-coupled to the other ends of said arm members; a V-shaped central portion, the apex of the V being towards said fixed member; and, a third arm member in said plane of a length equal to said other two arm members, one of said third arm member being flex-coupled to said V at the apex thereof, said third arm extending away from said fixed member at about right angles thereto, the other end of said third arm being coupled to a fixed point;
    a detector support member mounted, at points intermediate said apex of the V and the pair of arms, on the outer portion of the moving member; encoder means to which is fed the output of said V-slit detector, said encoder means providing a clockwise count of the V-slit detector signals in one direction, a counterclockwise count of the V-slit detector signals in the other direction; a reference pulse which coincides with the optical axis within a small tolerance; and, logic means coupled to said encoder means to determine the relative location of the star in azimuth and elevation along predetermined coordinates.

3. A device as claimed in claim 2, there being a double V-slit detector formed by two pairs of slit sensing means, the slit sensing means of each pair being separated by about the width of each slit; a center tap between each pair of slit sensing means, and circuit means including a time delay element for adding the outputs of each slit.

References Cited

UNITED STATES PATENTS

| | | | |
|---|---|---|---|
| 2,994,780 | 8/1961 | Wilcox | 250—203 |
| 2,999,939 | 9/1961 | Bible et al. | 88—1 XR |
| 3,110,812 | 11/1963 | Hulett et al. | 250—203 |
| 3,185,852 | 5/1965 | Lewis | 250—203 XR |

JEWELL H. PEDERSEN, *Primary Examiner.*

O. B. CHEW, *Assistant Examiner.*